Jan. 16, 1951     E. L. PERRY     2,538,703
FISH BAIT
Filed April 15, 1947
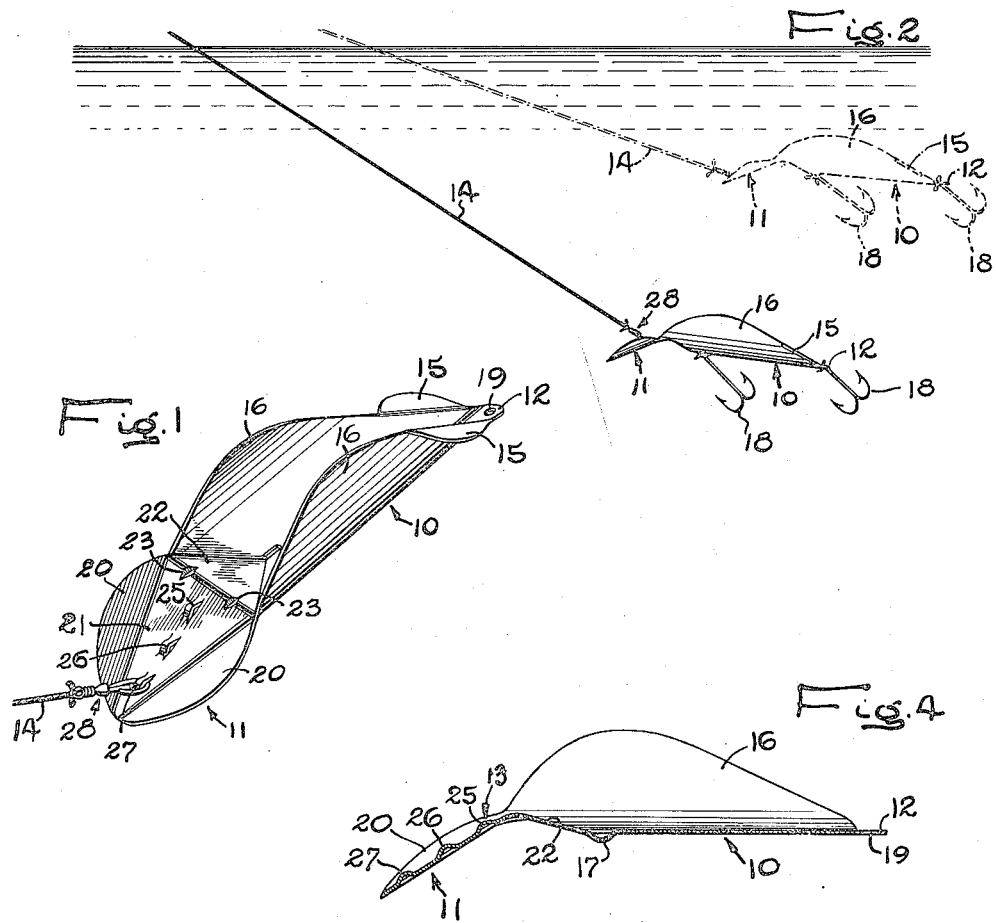
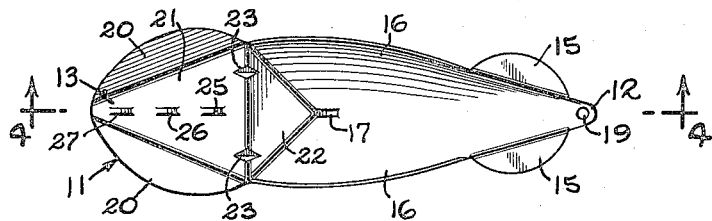
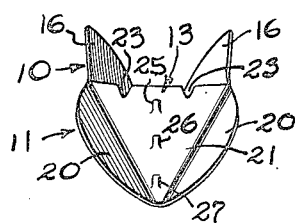
INVENTOR
Elwood L. Perry
ATTORNEYS Patented Jan. 16, 1951

2,538,703

UNITED STATES PATENT OFFICE 2,538,703

FISH BAIT

Elwood L. Perry, Hickory, N. C.

Application April 15, 1947, Serial No. 741,507

3 Claims. (Cl. 43—42.5)

The invention relates to a fish bait of the type adapted to be drawn through the water as a lure to attract fish.

One object of the invention is to provide a fish bait of the above general character adapted to be made from a single piece of sheet material and which can be made to travel with a smooth, easy, oscillating action similar to that of a conventional spoon, or with a vigorous, wiggling and dodging action characteristic of plugs to suit the varied requirements of game fishing.

Another object is to provide a sheet metal fish bait adapted to be connected to a line for traveling at selected different depths, and which will travel uniformly at the selected depth irrespective of the rate at which it is drawn through the water.

A further object is to provide a sheet metal fish bait which does not spin on fast retrieves or trolling, and yet produces full action on slow retrieves.

Other objects and advantages of the invention will become apparent from the following detailed description of the preferred embodiment illustrated in the accompanying drawing, in which:

Figure 1 is a perspective view of a fish bait embodying the features of the invention.

Fig. 2 is a view showing the manner in which an improved fish bait is connected to a line for producing different actions and for operating at different depths.

Fig. 3 is a plan view of the fish bait.

Fig. 4 is a longitudinal sectional view of the fish bait taken in a horizontal plane substantially on the line 4—4 of Fig. 3.

Fig. 5 is a front elevational view of the fish bait.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The improved fish bait is adapted to be constructed of sheet material, preferably of sheet metal, such as copper, stainless steel, or other nonrusting alloy. The bait is fashioned to provide an elongated channel-like body 10 generally U-shaped in cross section having a forwardly and downwardly inclined spoon-shaped lip 11 at its larger or forward end, the body converging substantially to a point adjacent the rear end, which is flattened to form a tailpiece 12. Provision is made for connecting a line 14 to the lip portion of the bait at a plurality of positions to secure different actions and to cause the bait to run at different depths when drawn through the water. For this purpose the lip portion of the bait is provided with a plurality of connecting elements 13 related to the other elements of the bait in a manner effective to produce the desired actions and depths of travel. Stabilizing tabs 15 projecting laterally from the body 10 adjacent the tail end thereof prevent the bait from spinning, that is, from rotating about its longitudinal axis, and insure proper running at all speeds and depths.

In the preferred form shown, the bait is made from a single piece of sheet metal which is die-stamped or otherwise cut to provide a blank having an enlarged generally oval portion merging at one end into a smaller rounded portion forming the lip 11, and at the other end into the tailpiece 12. The oval portion of the metal sheet is arcuately bent along its longitudinal axis into generally U-shaped configuration to form the body 10 of the bait.

Due to the shape of the body portion of the blank, the finished body presents opposed side walls 16 which are of maximum height somewhat forwardly of the center of the body. As will be seen by reference to Fig. 4 of the drawing, the walls 16 taper relatively steeply toward the front end of the body and more gradually toward the rear end thereof. Thus when viewed from the side, the body 10 is generally similar in contour to the body of a minnow or other small fish.

The side walls 16 of the body are also curved longitudinally, as will be seen by reference to Fig. 3 of the drawings. This curvature is such that the walls 16 converge toward a point located somewhat rearwardly of the tailpiece 12. As herein shown, the stabilizing tabs 15 are formed integral with the side walls 16 and are bent outwardly therefrom to lie in planes substantially parallel to the upper edges of the walls. The stabilizing tabs are thus inclined with respect to the longitudinal axis of the body 10.

To provide for the attachment of hooks, a narrow strip of metal forming a closed loop 17 is struck out from the underside of the body 10, preferably somewhat forwardly of the center of the same. A conventional cluster hook 18 is secured to the loop 17. A similar cluster hook 18 is secured to the tailpiece 12, which is formed with an aperture 19 for engagement with the shank of the hook. It will be understood, of course, that the hooks are attached so that they may swing freely when the bait is drawn through the water.

The lip portion of the metal blank above referred to is shaped so that it sets up currents in the water, which act on the side walls 16 of the body 10 and the stabilizing tabs 15 to impart the desired action or movements to the bait when it is drawn through the water. To this end, the marginal edge portions of the lip 11 are bent upwardly to form outwardly sloping rearwardly diverging wings 20 which extend forwardly at opposite sides of a triangular flat central section 21. The central section 21 merges at its base with the body 10, which is preferably formed with a similar shaped upwardly sloping flat section 22. In the formation of the bait the lip 11 is bent downwardly at an angle to the longitudinal axis of the body and the junction between the parts, that is, between the sections 21 and 22, is reinforced by longitudinal indentations 23 which stiffen the joint and effectually maintain the lip at the desired angle when the bait is in use.

Of primary importance is the location of the connecting elements 13 and their relationship to the other elements of the bait, which largely determine the action of the bait when drawn through the water. In the exemplary bait, three of the connecting elements are provided, each comprising a narrow strip of metal struck up from the central portion 21 of the lip to form a closed loop dimensioned to receive a conventional snap connector 28 of the type commonly used with game fishing tackle.

The connecting elements 13 are disposed in a row substantially on the center line of the lip 11 and are spaced progressively from the body 10 of the bait at positions designated respectively as 25, 26 and 27. Thus one element is located at position 25 closely adjacent the junction between the body and the lip, and another element is located at position 27 adjacent the front edge of the lip. The third element in this instance is located at position 26 substantially midway between the other two positions.

It has been found that when the bait is drawn through the water by means of a force applied at the connecting position 25, it tends to move with a vigorous wiggling and dodging action characteristic of plug-type baits. This is apparently due to the fact that the pulling force is applied closely adjacent the center of balance of the bait, coupled with the action of the currents set up by the wings 20 on the body 10 of the bait and the stabilizing tabs 15. Moreover, the tabs appear to hold the bait at a particular depth irrespective of the speed with which the bait is drawn through the water, and they additionally prevent the bait from spinning or rotating about its longitudinal axis.

When the point at which the pulling force is applied, or in other words the connection of the line, is shifted forwardly to positions 26 or 27, which are progressively farther from the center of balance of the bait, the movements become less vigorous. Thus, when the line is connected to the foremost position 27, the bait travels with a smooth, easy, oscillating action similar to that of a conventional spoon bait. When position 26 is used for the connection, the movements of the bait are substantially a combination of those produced by connections to the other two positions.

The point of connection of the line to the bait also determines the depth at which the bait runs through the water. For minimum depth, the line is connected at position 27 which is nearest to the front edge of the lip. A connection at position 26 causes the bait to run at an intermediate depth, while a connection at position 25 results in the bait running at maximum depth. As indicated heretofore, the action of the stabilizing tabs 15 insures the maintenance of the desired depth irrespective of the speed of travel of the bait.

It has also been found that the shape and relationship of the parts, as above described and particularly the position of the stabilizing tabs 15 effectually prevent the bait from spinning on fast retrieves, and yet insures full action on slow retrieves. In other words, the relationship of parts is such that proper action of the bait and proper depth of run is obtained regardless of whether the bait is drawn through the water relatively fast as when trolling or during fast retrieves, or at substantially slower speeds.

It will be apparent from the foregoing that the invention provides a fish bait of novel and improved construction. By merely changing the point of connection with the line, the bait can be made to travel with the smooth, easy, oscillating movement of a conventional spoon, or with the vigorous wiggling and dodging action of the plug, or with a combination of those actions. Moreover, the depth of travel can be similarly regulated to suit the particular conditions under which the bait is used. Through the novel construction and relationship of parts, spinning of the bait is effectually prevented, yet full action is obtained irrespective of the speed at which the bait is drawn through the water. Thus, I provide a bait which has a wide range of adaptability and which can be readily operated to suit prevailing conditions. The bait is simple and sturdy in construction, and since it is made from a single piece of sheet metal, it may be produced at relatively low cost.

I claim as my invention:

1. A fish bait adapted to be fabricated from a unitary blank of sheet metal comprising an elongated body fashioned from a generally oval section of the blank arcuately bent along its longitudinal axis and tapering gradually from front to rear, said body having a flat triangular shaped portion formed therein, a lip member projecting forwardly and downwardly from the front end of said body, said lip member having a flat generally triangular central section merging at its base with the similarly shaped flat section formed in said body, the junction between said sections being reinforced by longitudinal indentations to maintain the lip member at a predetermined angle to the body.

2. A fish bait fabricated from a unitary sheet metal blank comprising an elongated body fashioned from a generally oval section of the blank arcuately formed along its longitudinal axis into generally U-shaped configuration and tapering gradually toward the rear, a lip member fashioned from a section of the blank at the forward end of said body section having a flat generally triangular central portion merging at its base with a similarly flattened portion of the body section, said lip member having its marginal edge portions extending forwardly at an angle to said central portion to present their inner faces in the intended direction of movement of the bait and at an acute angle to the longitudinal axis of said body, and means for attaching a line to the central portion of said lip member.

3. A fish bait adapted to be fabricated from a unitary blank of sheet material comprising an elongated body fashioned from a generally oval section of the blank arcuately bent along its longitudinal axis and tapering gradually from front to rear, said body having a flat triangular shaped section formed therein, a lip member projecting forwardly from the front end of said body, said lip member having a flat generally triangular central section merging at its base with the triangularly shaped flat section formed in said body, the flat section of said body sloping upwardly toward the front end of the body and the flat section of said lip sloping downwardly from the junction between the sections.

ELWOOD L. PERRY.

REFERENCES CITED

The following references are of record in the file of this patent:

UNITED STATES PATENTS

| Number | Name | Date |
| --- | --- | --- |
| D. 87,050 | Dunkelberger | May 31, 1932 |
| 1,098,444 | Ingalls | June 2, 1914 |
| 1,233,507 | Reynolds | July 17, 1917 |
| 1,297,617 | Welles | Mar. 18, 1919 |
| 1,585,943 | Streich | May 25, 1926 |
| 1,806,088 | Schnell | May 19, 1931 |
| 1,873,682 | Van Ness | Aug. 23, 1932 |
| 1,963,380 | Peters | June 19, 1934 |
| 2,088,775 | Davenport | Aug. 3, 1937 |
| 2,155,294 | Barnett | Apr. 18, 1939 |
| 2,394,132 | Zeibig | Feb. 5, 1946 |
| 2,423,615 | Pecher | July 8, 1947 |